Nov. 30, 1948.   E. TRAUB   2,454,896
AUTOMOBILE POSITION SIGNAL
Filed Dec. 26, 1946
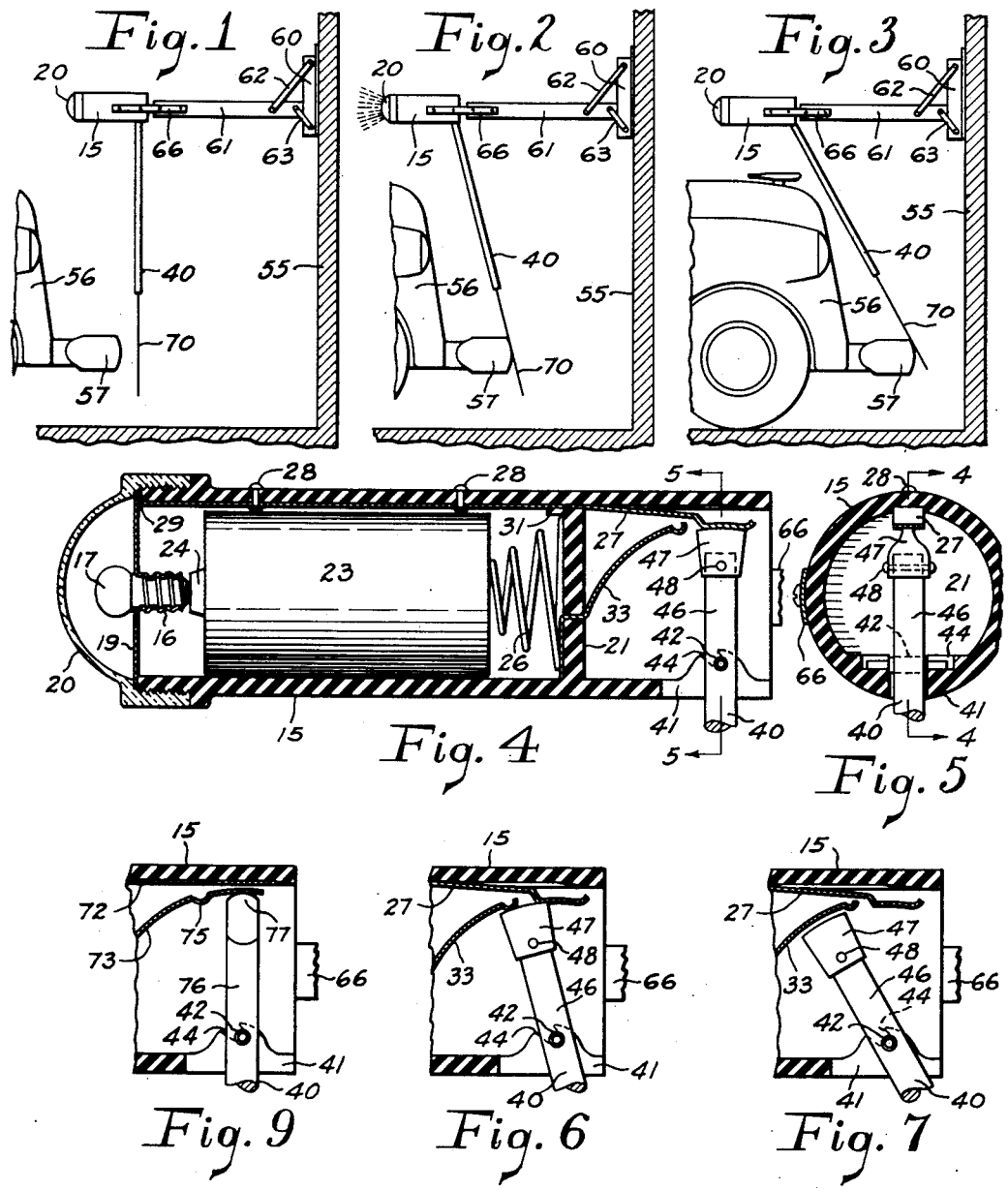
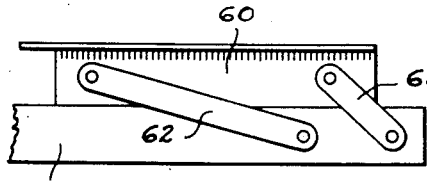
Inventor
ELLIS TRAUB Patented Nov. 30, 1948

2,454,896

UNITED STATES PATENT OFFICE 2,454,896

AUTOMOBILE POSITION SIGNAL

Ellis Traub, Worcester, Mass.

Application December 26, 1946, Serial No. 718,493

3 Claims. (Cl. 177—311)

1

This invention relates to automobile position signals, and more particularly to a device arranged to assist an automobile operator, who has just driven into a garage, in stopping his car at a desired distance from the rear wall of the garage.

Many an automobile is nearly as long as the garage in which it is housed, so that it is necessary to drive the car close to the rear wall. Since the driver cannot see the front bumper from his seat in the car, it often happens that this bumper is brought forcibly into contact with the wall. In the course of time plaster in the wall will be broken, bricks or stones will be loosened, or wood will be splintered, and the car bumper may be scratched and start to rust. A similar problem exists if the car is backed into the garage.

It is accordingly one object of the invention to provide a simple, inexpensive, and dependable signal adapted to warn an automobile operator when he has approached within a desired distance of the rear wall of a garage.

It is a further object of the invention to provide an automobile position signal adapted for installation adjacent the rear wall of a garage and arranged to warn an automobile operator in a dependable manner when he has reached a desired position with relation to said wall.

It is a further object of the invention to provide an automobile position signal for installation in a garage and arranged to operate in a desired manner whether the car enters the garage forwardly or rearwardly.

It is a further object of the invention to provide an automobile position signal which will be visual rather than audible, and hence effective above the noise of the automobile engine.

It is a further object of the invention to provide an automobile position signal including an electric lamp as a signal element, the construction being such that no electrical wiring will be required for installation.

With these and other objects in view, as will be apparent to those skilled in the art, the invention resides in the combination of parts set forth in the specification and covered by the claims appended hereto.

Referring to the drawing illustrating one embodiment of the invention, and in which like reference numerals indicate like parts, Fig. 1 is a side elevation of an automobile position signal, with an automobile approaching;

Fig. 2 is a view similar to Fig. 1, showing the automobile actuating the signal;

2

Fig. 3 is a view similar to Fig. 2, showing the automobile stopped in its final position;

Fig. 4 is an enlarged longitudinal section through the signal, the section being taken on the line 4—4 of Fig. 5;

Fig. 5 is a section taken on the line 5—5 of Fig. 4;

Fig. 6 is a fragmentary view of a portion of Fig. 4, with the parts in a different position;

Fig. 7 is a view similar to Fig. 6 showing the parts in a still different position;

Fig. 8 is a fragmentary side elevation of a supporting bracket, shown in its folded position; and Fig. 9 is a fragmentary view similar to a portion of Fig. 4, showing a modified form of electric switch.

The embodiment illustrated, as best shown in Figs. 4 and 5, comprises a substantially horizontal cylindrical tube 15 which may be constructed of a suitable electrical insulating material. This tube forms the main frame of the device. At the front end of the tube there is mounted a lamp socket 16 of the usual screw-threaded type which supports a small electric lamp or bulb 17. The socket 16 is shown integral with a metal disk 19 which is held against the end of the tube 15 by a transparent cap 20 arranged to enclose the lamp 17. This cap 20 may be colored red, if desired, and it is attached to the front end of the tube by screw threads. The tube 15 is provided with a transverse partition 21 spaced forwardly from the rear end of the tube and shown integral with the tube. An electric battery 23 of the dry cell type is mounted directly behind the lamp, this battery having the usual front terminal 24 in contact with the lamp base. The battery is urged forwardly by means of a coiled metal wire spring 26 located between the partition 21 and the battery, this spring being in contact with the adjacent metal end of the battery.

Electrical circuit connections, including a normally open switch, are provided between the battery 23 and the lamp 17. For this purpose a narrow metal strip 27 extends longitudinally within the tube 15 and is secured to the upper wall thereof by rivets 28. The front end of this strip is bent upwardly at 29 and makes contact with the disk 19. The strip 27 extends through the partition 21, and its rear portion forms part of an electric switch. Preferably a small lug 31 is provided on the front surface of the partition 21, directly beneath the strip 27, in order to prevent the spring 26 from making contact with the strip.

A second narrow metal strip 33 extends through the partition 21 beneath the strip 27. The front portion of this lower strip 33 is bent downwardly for contact with the spring 26, while the rear portion curves upwardly and rearwardly to terminate close to the rear portion of the upper strip 27 and form another part of the electric switch.

In order to operate the switch 27—33, there is provided an actuator in the form of an upright rod 40 which extends through a longitudinally extending slot 41 in the lower wall of the tube 15, behind the partition 21. This rod is pivotally secured to the tube by means of a transverse pin 42 which rests in upwardly open grooves 44 at opposite sides of the slot 41. With this construction the rod depends from the tube and is free to swing through a considerable arc forwardly and rearwardly in a vertical plane. The rod is suitably connected to the switch, and for this purpose the rod is provided with an upwardly extending portion 46 having a metal cap 47 mounted on its upper end and firmly attached thereby by a transverse rivet 48. When the rod 40 is hanging vertically, in its normal position, the cap 47 will be directly beneath the rear portion of the strip 27 and preferably in contact therewith, as shown in Fig. 4. In this position the cap 47 will not touch the strip 33, and the switch will be open. If the rod is swung slightly to the rear, as shown in Fig. 6, the cap will engage both the strips 27 and 33, and the switch will be closed. Upon further rearward movement of the rod, as shown in Fig. 7, the cap 47 will move out of contact with the strip 27 and the switch will again be open.

Referring now to Figs. 1, 2, and 3, there is shown a garage having a rear wall 55, and an automobile 56 approaching this wall, the automobile having the usual transverse front bumper 57. The tube 15 is supported from the wall 55 with the lamp 17 directed forwardly toward the on-coming automobile and in position to be readily seen by the operator. Preferably the tube is held at a height somewhat above the top of the automobile hood. For this purpose there is provided a bracket comprising a flanged base 60 and a horizontal bar 61 connected to the base by two links 62 and 63. The base 60 is adapted to be secured to the wall 55 by nails, screws or the like, with the bar 61 extending forwardly from the wall. The tube 15 is attached to the front end of the bar 61 by means of metal strips 66 located on opposite sides of the parts and connected thereby by screws or other fastening means. With the parts mounted as shown, the rod 40 will lie in the path of the automobile bumper 57. If desired, the lower portion of the rod, which the bumper actually engages, may be formed of a metal wire or strip 70 capable of withstanding severe blows without damage, whereas the remainder of the rod may be of wood or other light inexpensive material. As shown in Fig. 8, the links 62 and 63 permit the base 60 to be folded against the bar 61 to economize on space when the parts are packed for shipment. The rod 40 may be readily removed from the tube 15 for shipping purposes.

In Fig. 9 there is illustrated a slightly modified form of electric switch in which the metal strips 27—33 of Fig. 1 are replaced by somewhat differently shaped strips 72 and 73 respectively. The lower strip 73 is bent to form a slight downward bulge 75, and the rod 40 is provided with an upward extension 76 which is flattened on opposite sides and rounded at its upper end 77, the cap 47 of Fig. 4 being omitted. When the rod 40 is swung slightly to the rear, the rounded upper end 77 of the extension 76 will engage the bulge 75 and flex the strip 73 upwardly against the strip 72 to close the switch. Upon further rearward movement of the rod 40, the part 77 will pass forwardly beyond the bulge 75, and the switch 72—73 will open.

The operation of the invention will now be apparent from the above disclosure. With no automobile in the garage, the rod 40 will hang freely in a vertical position, as shown in Fig. 1. The switch 27—33 (Fig. 4) will be open, no current will flow from the battery 23, and the lamp 17 will be unlighted. As an automobile 56 enters the garage and approaches the rear wall 55, the automobile bumper 57 will engage the lower portion 70 of the rod 40 and swing the rod to the rear, as shown in Fig. 2. This will cause the metal cap 47 to connect the strips 27 and 33 in the manner indicated in Fig. 6, thereby closing the switch. A circuit will thus be completed from the front terminal 24 of the battery through the lamp 17, the socket 16, the disk 19, the strips 27, the cap 47, the strip 33, and the spring 26 to the rear end of the battery. The lamp 17 will accordingly be lighted, warning the operator that he has nearly reached the desired position. By driving the car only slightly closer to the wall 55, as shown in Fig. 3, he will swing the rod slightly further to the rear, thus moving the cap 47 out of contact with the strip 27 in the manner indicated in Fig. 7. This will open the switch and break the circuit, the lamp will be unlighted again, and the operator will bring the automobile to a stop. If desired, the automobile may be backed into the garage and the signal will nevertheless warn the operator when he is close to the rear wall, since he can see the reflection of the lamp 17 in his rear-view mirror. The operation of the modification shown in Fig. 9 will be similar, since the rounded upper end 77 will engage the bulge 75, upon slight rearward movement of the rod 40, and thereby close the switch momentarily by flexing the strip 73 upwardly into contact with the strip 72. The construction shown in Fig. 4 is preferred, since it provides a wiping contact between the cap 47 and the strips, thus keeping the surface clean to ensure adequate flow of current at the proper time. It will be clear that as the automobile leaves the garage, the rod 40 will return to its original position by the action of gravity.

The device is simple, inexpensive, and dependable. No electrical wiring is required, and installation is a very simple matter. The battery 23 will have a long life, since only a momentary supply of current is required. To replace the battery, it is merely necessary to remove the cap 20 and the disk 19 with the lamp 17 supported thereby.

Having thus described my invention what I claim as new, and desire to secure by Letters Patent is:

1. An automobile position signal adapted for mounting adjacent to the rear wall of a garage and comprising an electric lamp, a frame to support the lamp in position to be seen readily by the operator of an automobile entering the garage, a normally open switch to control the flow of electric current to the lamp, an actuator supported by the frame and free to move rearwardly for a considerable distance, the actuator being in position to be engaged by a portion of an automobile approaching the wall and thus be moved rearwardly, and connections between the actuator and the switch effective to close the switch upon a slight rearward movement of the actuator and to open the switch upon further rearward movement of the actuator.

2. An automobile position signal adapted for mounting adjacent to the rear wall of a garage and comprising an electric lamp, a frame to support the lamp in position to be seen readily by the operator of an automobile entering the garage, an electric battery supported by the frame, electrical circuit connections between the battery and the lamp and including a normally open switch, an actuator supported by the frame and free to move rearwardly for a considerable distance, the actuator being in position to be engaged by a portion of an automobile approaching the wall and thus be moved rearwardly, and connections between the actuator and the switch effective to close the switch upon slight rearward movement of the actuator and to open the switch upon further rearward movement of the actuator.

3. An automobile position signal comprising a tube, an electric lamp mounted at one end of the tube, supporting means for the tube adapted to be mounted on the rear wall of a garage with the lamp in position to be seen readily by the operator of an automobile entering the garage, an electric battery mounted within the tube, electrical circuit connections between the battery and the lamp and including a normally open switch, an actuator depending from the tube and pivotally supported thereby for free swinging movement through a considerable arc forwardly and rearwardly, the actuator being in position to be engaged by a portion of an automobile approaching the wall and thus be swung rearwardly, and connections between the actuator and the switch effective to close the switch upon slight rearward movement of the actuator and to open the switch upon further rearward movement of the actuator.

ELLIS TRAUB.

REFERENCES CITED

The following references are of record in the file of this patent:

UNITED STATES PATENTS

| Number | Name | Date |
| --- | --- | --- |
| 1,981,188 | Pavitt | Nov. 20, 1934 |
| 2,028,037 | Babson | Jan. 14, 1936 |
| 2,144,286 | Dawson | Jan. 17, 1939 |

FOREIGN PATENTS

| Number | Country | Date |
| --- | --- | --- |
| 494,424 | Great Britain | Oct. 26, 1938 |